United States Patent Office 2,888,487
Patented May 26, 1959

2,888,487
PROCESS FOR THE PRODUCTION OF α-MERCAPTOKETONES

Friedrich Asinger and Max Thiel, Leuna, and Edith Pallas, Halle, Germany, assignors to VEB Leuna-Werke "Walter Ulbricht," Leuna, Germany No Drawing. Application October 11, 1956
Serial No. 615,227

Claims priority, application Germany April 14, 1956

4 Claims. (Cl. 260—593)

This invention relates to mercaptoketones and more particularly to a process for the production of α-mercaptoketones.

The chemical literature contains but scanty information about the preparation of α-mercaptoketones. In known processes for the preparation of α-mercaptoketones, α-halogenated ketones serve as starting material. Thus, α-halogenated ketones may be reacted with potassium xanthogenate—which xanthogenate is formed from glycolic acid and carbon disulfide—and subsequently split in hydrolytic manner. It has also been proposed to convert the α-halogenated ketones directly with sodium hydrosulfide in aqueous or alcoholic solution into the corresponding α-mercaptoketones.

However, the yields obtained in accordance with the known processes are oftentimes unsatisfactory. Moreover, since α-halogenated ketones strongly irritate the mucous membranes elaborate protecting measures in the use of these ketones have to be taken.

It is an object of this invention to provide a novel process by means of which α-mercaptoketones are prepared in a simple manner.

In accordance with this invention, α-mercaptoketones are obtained in a smooth reaction by reacting sulfur or a polysulfide, such as for example sodium- or ammonium- polysulfide or dialkylsulfide with a keto-group comprising compound under the simultaneous action of ammonia and subjecting the Δ-3,4-thiazoline thus obtained to an aicd hydrolysis. The synthesis of Δ-3,4-thiazolines has been described in the copending application Ser. No. 615,013, now U. S. Patent No. 2,865,924, for "Novel Thiazolines and a Process for Their Manufacture" filed in the United States Patent Office simultaneously with the present application in the name of the inventors Friedrich Asinger, Max Thiel, Hans Kaltwasser and Gerhard Reckling, assignors to VEB Leuna-Werke "Walter Ulbricht." The synthesis of Δ-3,4-thiazolines has been described in said copending application in great detail. The Δ-3,4-thiazolines obtained in accordance with the synthesis of the copending application referred to are thus advantageous starting compounds for the production of α-mercaptoketones in accordance with the process of the present invention. The α-mercaptoketones may, in turn, be used in the preparation of thiazolines in accordance with the copending application Serial No. 615,025 filed October 10, 1956.

With a view of preventing that the α-mercaptoketones, which are formed as a result of the acid hydrolysis, are converted into the corresponding 2,5-endoxy-dithianes, it is advantageous to perform the hydrolysis with diluted mineral acids or with diluted weak acids, as, for example, acetic acid.

The reaction proceeds in such a manner that 1 mole of a Δ-3,4-thiazoline which may be obtained in accordance with the process of the copending application referred to yields 1 mole of mercaptoketone and 1 mole of ketone. The ketone obtained, is the same ketone which is employed in the preparation of the Δ-3,4-thiazoline compound to be hydrolyzed. If this ketone is isolated and thus recovered, it may be employed again in the process for the preparation of Δ-3,4-thiazoline, whereby the ketone may be converted practically completely into the corresponding α-mercaptoketones.

The process for the production of α-mercaptoketones from Δ-3,4-thiazolines will now be described by several examples. However, it should be understood that these examples are given by way of illustration, rather than by way of limitation and many changes in, for example, quantities, choice of starting materials, and process conditions in general may be effected without departing in any way from the spirit and scope of the invention.

Example 1

172 grams of diethylketone are mixed with 32 grams of sulfur (flower of sulfur or powderized roll sulfur). Gaseous ammonia is introduced into the slurry thus obtained. After two hours the reaction mixture is taken up in benzene or another solvent which is inert to the reactants. After separation of the reaction water, the solution is washed with water several times. After drying, the solvent is evaporated and the residue is distilled in vacuo. An oil having a boiling point of 97° C./10 mm. is obtained. Up to this point the present example corresponds substantially to Example 2 of said copending application and accordingly the oil obtained can be identified as 2,2,4 - triethyl - 5 - methyl - thiazoline-Δ-3,4- ($C_{10}H_{19}NS$). This oil is admixed with 500 cubic centimeters of 2-n-hydrochloric acid (1 mole HCl). The reaction mixture thus obtained is then stirred for about three hours at a temperature of 60 to 65° C. After cooling, the reaction mixture is extracted with ether and the ether solution is shaken out with diluted sodium hydroxide solution. The ether layer thus obtained contains diethyl ketone, small amounts of the starting material and an oil of the composition $C_{10}H_{18}OS_2$. The ether is then expelled from the ethereal layer and the residue yields about 60 to 70 grams of diethylketone (boiling point 101–103° C./760 mm). This quantity of diethylketone may, if desired, be used for the production of a further batch of α-mercaptodiethylketone.

The aqueous alkaline layer is acidified and likewise extracted with ether. After the expelling of the ether, the residue is distilled, whereby a fraction of a boiling point of 156 to 158° C. is obtained. This fraction consists of α-mercaptodiethyl ketone (85 grams). Considering the recovered diethyl ketone, the yield corresponds to 75% of the theory. The reactions herein described proceed according to the following formula:

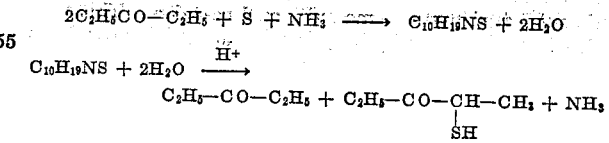

Example 2

144 grams of methylethyl ketone are mixed with 32 grams of sulfur (flower of sulfur or powderized roll sulfur). Gaseous ammonia is introduced into the slurry thus obtained. After two hours, the dark brown reaction mixture thus obtained is admixed with ether, whereafter the reaction water is separated and the ether solution is washed with water. After drying, the ether is evaporated and the residue is distilled in vacuo. An oil of a boiling point of 70° C./6 mm. is obtained. Up to this point the present example substantially corresponds to Example 1 of said copending application and the oil obtained can be identified as 2,4,5-trimethyl-2-ethylthiazoline-Δ-3,4($C_8H_{15}NS$). This oil is then stirred with 1500 cubic centimeters of acetic acid of 10% strength at room temperature for about five hours. The reaction mixture is then extracted with ether and the ether extract is carefully washed with water. The ether solution is then extracted with diluted sodium hydroxide solution. Upon fractionated distillation of the dried ether solution 50–60 grams of butanone are obtained which butanone may be supplied to a further batch for the production of α-mercaptoketone.

On acidifying the alkaline layer, an oil separates, which oil is taken up in ether. After the evaporation of the ether, 2-mercaptobutanone-3 of a boiling point of 50° C./18 mm. distils. The yield amounts to 73 grams, which corresponds to 70% of the theory.

*Example 3*

228 grams of di-n-propylketone are mixed with 32 grams of sulfur and 500 cubic centimeters of benzene (or another solvent which may serve as carrier for water). Ammonia is introduced into the reaction mixture at the boiling temperature thereof. The introduction of the ammonia at the boiling temperature is continued until no more water-containing benzene distils off. The benzene containing reaction mixture is then washed with water and is subsequently subjected to a vacuum distillation. An oil of a boiling point of 130° C./8 mm. is obtained. Up to this point the present example substantially corresponds to Example 5 of said copending application and the oil obtained may be identified as 2,2,4 - tri - n - propyl-5-ethylthiazoline-Δ-3,4($C_{14}H_{27}NS$). This oil is treated with diluted acetic acid in the same manner as has been described in connection with Example 2. After the hydrolysis, the mixture is extracted with ether. The ether extract is then shaken with diluted alkali solution.

By adding an acid to the akaline solution, an oil separates which upon distillation yields two fractions, namely:

(1) 90 grams of dipropylketone at 28–30° C./4 mm., and (2) 105 grams of 3-mercaptoheptanon-4 at 58° C./4 mm.

This yield corresponds to 65% of the theory.

*Example 4*

172 grams of diethylketone are admixed with 220 grams of diethylpentasulfide. A lively flow of gaseous ammonia is introduced into the mixture thus obtained. The introduction of the ammonia causes heating of the mixture. When the temperature of the reaction mixture starts going down again, the latter is cooled and diluted with water, whereafter the organic layer formed is taken up with ether. After washing with water and subsequent drying of the ether extract, the ether is expelled. Up to this point the present example corresponds to Example 8 of said copending application and the residue comprises thus 2,2,4-triethyl - 5 - methylthiazoline-Δ-3,4. This residue is subjected to hydrolysis with diluted hydrochloric acid as described in connection with Example 1. The following hydrolysis products are obtained:

70 grams of diethylketone (boiling point 101–103° C./760 mm.), and 90 grams of α-mercaptodiethylketone (boiling point 156–158° C./760 mm.).

What we claim is:

1. A process for the production of α-mercaptoketones, comprising the steps of subjecting Δ-3,4-thiazolines of the general formula

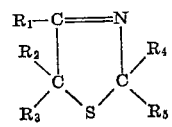

wherein $R_1$, $R_3$, $R_4$ and $R_5$ are lower alkyl radicals and $R_2$ is selected from the group consisting of lower alkyl radicals and hydrogen, to an acid hydrolysis, whereby α-mercaptoketone and a keto-group containing compound are formed, and separating said α-mercaptoketone said acid hydrolysis being carried out by an acid solution selected from the group consisting of dilute mineral acids and dilute weak acids.

2. A process for the production of α-mercaptodiethylketone, comprising the steps of hydrolyzing 2,2,4-triethyl-5-methylthiazoline-3,4-Δ with a diluted acid, whereby diethylketone and α-mercaptodiethylketone are obtained, and separating said diethylketone and said α-mercaptodiethylketone from each other said diluted acid being an acid solution selected from the group consisting of diluted mineral acid and diluted weak acid.

3. A process for the production of 2-mercaptobutanone-3, comprising the steps of hydrolyzing 2,4,5-trimethyl-2-ethylthiazoline-Δ-3,4 with a diluted acid, whereby butanone and 2-mercaptobutanone-3 are obtained, and separating said butanone and said 2-mercaptobutanone-3 from each other said diluted acid being an acid solution selected from the group consisting of diluted mineral acid and diluted weak acid.

4. A process for the production of 3-mercaptoheptanon-4, comprising the steps of hydrolyzing 2,2,4-tri-n-propyl-5-ethylthiazoline-Δ-3,4 with a diluted acid, whereby dipropylketone and 3-mercaptoheptanon-4 are obtained, and separating said dipropylketone and said 3-mercaptoheptanon-4 from each other said diluted acid being an acid solution selected from the group consisting of diluted mineral acid and diluted weak acid.

References Cited in the file of this patent

UNITED STATES PATENTS

| | | |
|---|---|---|
| 2,212,150 | Burke | Aug. 20, 1940 |
| 2,363,462 | Morey | Nov. 21, 1944 |

OTHER REFERENCES

Gabriel: Beilstein (Handbuch, 4th Ed.), vol. 27, p. 13 (1937).